(12) United States Patent
Yamashita et al.

(10) Patent No.: US 9,303,746 B2
(45) Date of Patent: Apr. 5, 2016

(54) VEHICULAR TORQUE CONVERTER

(75) Inventors: Toshiya Yamashita, Toyota (JP); Takuya Okada, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 392 days.

(21) Appl. No.: 14/112,144

(22) PCT Filed: Apr. 18, 2011

(86) PCT No.: PCT/JP2011/059569
§ 371 (c)(1),
(2), (4) Date: Oct. 16, 2013

(87) PCT Pub. No.: WO2012/144010
PCT Pub. Date: Oct. 26, 2012

(65) Prior Publication Data
US 2014/0033694 A1 Feb. 6, 2014

(51) Int. Cl.
*F16H 45/02* (2006.01)
*F16H 41/24* (2006.01)

(52) U.S. Cl.
CPC .............. *F16H 45/02* (2013.01); *F16H 41/24* (2013.01)

(58) Field of Classification Search
CPC .............. F16H 41/24; F16H 2041/246; F16H 2041/285
USPC .................... 60/345, 361, 367, 362
See application file for complete search history.

(56) References Cited

U.S. PATENT DOCUMENTS

| 7,762,065 B2 * | 7/2010 | Ochi | F16H 41/24 60/341 |
| 2008/0173510 A1 * | 7/2008 | Saka | F16H 45/02 192/3.28 |

FOREIGN PATENT DOCUMENTS

| JP | A-2006-138429 | 6/2006 |
| JP | A-2008-75843 | 4/2008 |

* cited by examiner

*Primary Examiner* — Nathaniel Wiehe
*Assistant Examiner* — Dustin T Nguyen
(74) *Attorney, Agent, or Firm* — Oliff PLC

(57) ABSTRACT

A vehicular torque converter includes: a pump impeller having a pump covering and vanes disposed within an output-side portion of the pump covering; a turbine impeller having vanes opposed to the pump impeller vanes; a stator impeller; a one-way clutch between the stator impeller and a stationary member; and a lock-up clutch configured to connect the turbine impeller to an inner surface of a wall of said pump covering. The vanes are offset with respect to the one-way clutch toward the output side. The vehicular torque converter further includes: a thrust bearing between the stator impeller and the turbine impeller, the thrust bearing having a sliding surface with respect to the stator impeller, the sliding surface being positioned radially outwardly of the one-way clutch and offset from an end face of each of sprags of the one-way clutch toward the output side.

3 Claims, 3 Drawing Sheets

VEHICULAR TORQUE CONVERTER

TECHNICAL FIELD

The present invention relates to a torque converter provided on a vehicle, and more particularly to techniques for reducing loads acting on a pair of side bearings of a one-way clutch which support a stator impeller of the torque converter, which stator impeller has vanes that are offset with respect to the one-way clutch toward the output side of the torque converter.

BACKGROUND ART

There is known a vehicular torque converter which is provided as a fluid-operated power transmitting device in a power transmitting path between an engine serving as a drive power source of a vehicle and an automatic transmission and which is configured to boost a torque generated by the drive power source and to transmit the boosted torque to the above-described automatic transmission. Generally, the vehicular torque converter is provided with a pump impeller rotated about an axis by the drive power source such as an engine, a turbine impeller rotated about the above-indicated axis with a working fluid fed from the pump impeller, and a stator impeller disposed between the pump impeller and the turbine impeller rotatably about the above-indicated axis. The stator impeller is provided to change a direction of flow of the working fluid returned from the turbine impeller toward the pump impeller, so that the direction of flow includes a component parallel to the direction of rotation of the pump impeller, for assisting the rotation of the pump impeller, to thereby boost the output torque.

Patent Document 1 discloses an example of such a vehicular torque converter, which is made compact in construction by offsetting the vanes of the stator impeller supported by a stationary member via a one-way clutch, from the one-way clutch toward the output side, that is, toward the side of the vanes of the pump impeller, while similarly offsetting the vanes of the turbine impeller and the vanes of the pump impeller, and by providing the stator impeller with a thrust bearing in its shoulder portion formed between its radially inner cylindrical portion and an extension from a widthwise central part of the cylindrical portion toward the its vanes, so that the dimension of the vehicular torque converter in the direction of the above-indicated axis, namely, the axial dimension is reduced.

PRIOR ART DOCUMENT

Patent Document

Patent Document 1: JP-2008-075843 A

SUMMARY OF THE INVENTION

Object Achieved by the Invention

By the way, in the vehicular torque converter disclosed in the above-identified Patent Document 1 wherein the stator impeller is offset toward the side of the vanes of the pump impeller, with respect to the one-way clutch which is supported by the stator impeller, a radial load acting on a side of offset of the stator impeller during its rotation due to an imbalance of its offset portion generates a moment in the offsetting direction. This moment increases a load acting on one of a pair of side bearings located on the side of the vanes of the pump impeller, which side bearings are annular members fitted in the respective opposite end portions of an annular space in the axial direction which is formed between inner and outer circumferential surfaces of respective outer and inner races of the one-way clutch and in which sprags are disposed. The side bearings are provided to center the outer and inner races. To prevent deformation of the above-described side bearing due to the above-indicated load, it is necessary to re-design the shape or structure of the side bearing so as to have a sufficient mechanical strength. However, this re-designing is comparatively difficult, and causes a problem of an increase of a cost of manufacture of the torque converter, since the side bearing is disposed in the narrow space between the inner and outer circumferential surfaces of the outer and inner races of the one-way clutch.

The present invention was made in view of the background art described above. It is therefore an object of the present invention to provide a vehicular torque converter in which a stator impeller is offset from a one-way clutch supporting the stator impeller, toward the side of vanes of a pump impeller, and which makes it possible to eliminate a need of re-designing one of a pair of side bearings located on the side of the vanes of the pump impeller, which side bearings are fitted in an annular space between inner and outer circumferential surfaces of respective outer and inner races of the one-way clutch, to center the one-way clutch.

Means for Achieving the Object

The object indicated above is achieved according to a first aspect of the present invention, which provides a vehicular torque converter provided with: a pump impeller having a pump covering configured to receive a torque from a drive power source and a plurality of vanes disposed within an output-side portion of the pump covering such that the vanes are arranged successively in a circumferential direction of the pump covering; a turbine impeller having a plurality of vanes opposed to the vanes of the pump impeller and rotated with a working fluid fed from the vanes of the pump impeller; a stator impeller rotatably interposed between the pump impeller and the turbine impeller; a one-way clutch interposed between the stator impeller and a stationary member and supporting the stator impeller such that the stator impeller is rotatable in one direction; and a lock-up clutch configured to connect the above-described turbine impeller to an inner surface of a wall of the above-described pump covering, which wall is located on the side of the above-described drive power source, and wherein the vanes of the above-described stator impeller are offset with respect to the above-described one-way clutch toward the output side, the vehicular torque converter being characterized in that a thrust bearing is provided between the above-described stator impeller and the above-described turbine impeller, to bear thrust loads, the thrust bearing having a sliding surface with respect to the stator impeller, the sliding surface being positioned radially outwardly of the above-described one-way clutch and offset from an end face of each of sprags of the one-way clutch toward the pump impeller side.

According to a second aspect of the invention, the vehicular torque converter according to the first aspect of the invention is characterized in that a radially outer portion of a part of the above-described pump covering, which part is located on the side of the drive power source, is offset toward the output side such that a radially outer portion of the above-described lock-up clutch overlaps the above-described one-way clutch as seen in a radial direction.

According to a third aspect of the invention, the vehicular torque converter according to the first or second aspect of the invention is characterized in that the vanes of the above-described stator impeller are offset toward the output side, such that the vanes of the stator impeller do not overlap the above-described one-way clutch as seen in a radial direction.

Advantages of the Invention

In the vehicular torque converter according to the first aspect of the invention, the thrust bearing provided between the stator impeller and the turbine impeller to bear the thrust loads has the sliding surface with respect to the stator impeller, which sliding surface is positioned radially outwardly of the above-described one-way clutch and offset from the end face of each sprag of the one-way clutch toward the output side. In this respect, it is noted that a radial load acting on the stator impeller during its rotation due to an imbalance of its offset portion generates a moment in the offsetting direction about the output-side end face of each sprag of the one-way clutch. However, this moment is received by the sliding surface of the first thrust bearing with respect to the stator impeller, which sliding surface is positioned radially outwardly of the one-way clutch and offset from the end face of each sprag of the one-way clutch toward the side of the vanes of the above-described pump impeller, so that a compression load acting on one of a pair of side bearing located on the offsetting side, that is, on the side bearing located on the side of the vanes of the pump impeller, is reduced, whereby it is not necessary to re-design the shape or structure of the side bearing on the side of the vanes of the pump impeller so as to have a mechanical strength sufficient to prevent its deformation.

In the vehicular torque converter according to the second aspect of the invention, the radially outer portion of the part of the above-described pump covering, which part is located on the side of the drive power source, is offset toward the output side such that the radially outer portion of the above-described lock-up clutch overlaps the above-described one-way clutch as seen in a radial direction, whereby an annular space is formed on a drive-power-source side of the radially outer portion of the drive-power-source-side part of the pump covering, so that a damper device for reducing a variation of the input torque can be accommodated within this annular space formed adjacent to the drive power source. Accordingly, an overall axial dimension of the torque converter can be reduced.

In the vehicular torque converter according to the third aspect of the invention, the vanes of the above-described stator impeller are offset toward the pump impeller side, such that the vanes of the stator impeller do not overlap the above-described one-way clutch as seen in a radial direction, whereby a large annular space is formed on a drive-power-source side of the radially outer portion of a drive-power-source-side part of the pump covering, while a radially outer portion of an output-side part of the pump covering projects by a large amount toward the output side, so as to overlap a hydraulic pump by a large amount in the radial direction, so that the overall axial dimension of the torque converter can be further reduced.

MODE FOR CARRYING OUT THE INVENTION

The embodiment of this invention will be described in detail by reference to the drawings.

First Embodiment

Figure 1:
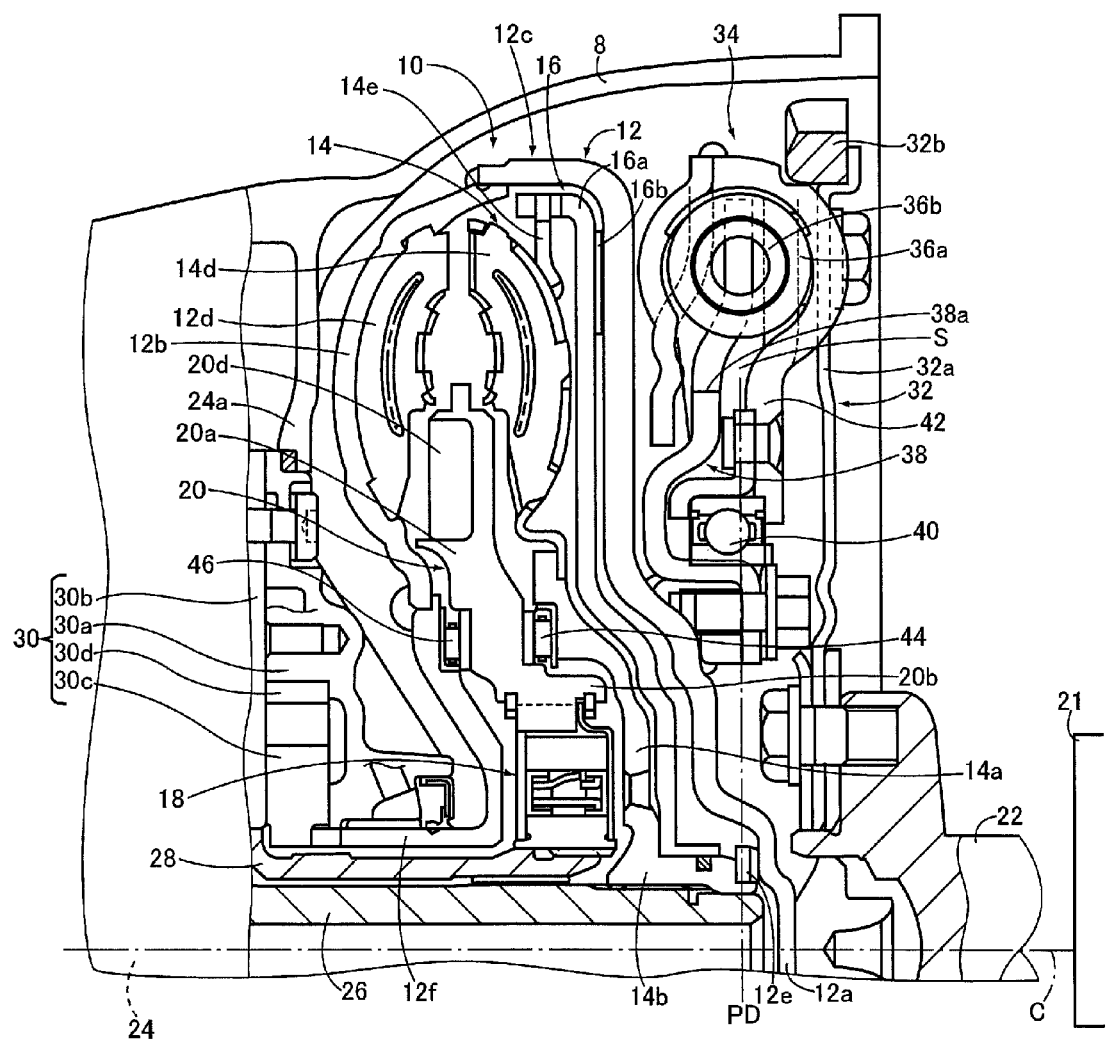
FIG. 1 is a cross sectional view for explaining an arrangement of a vehicular torque converter according to one embodiment of this invention.

FIG. 1 is the cross sectional view for explaining the arrangement of a vehicular torque converter 10 according to one embodiment of this invention. The torque converter 10 is disposed within a cylindrical housing 8 provided on a vehicle, and is provided with a pump impeller 12, a turbine impeller (turbine runner) 14, a lock-up clutch 16, a one-way clutch 18, and a stator impeller 20. The torque converter 10 is configured to boost a torque received from a crankshaft 22 of an engine 21 functioning as a drive power source, and to transmit the boosted torque to an input shaft 26 of a transmission 24, which functions as an output shaft of the torque converter 10.

The pump impeller 12 is provided with a pump covering 12c consisting of a disc-like front covering 12a and rear covering 12b, and a plurality of vanes 12d. The pump covering 12c is connected to the crankshaft 22 of the engine 21 via a driving plate 32 and a damper mechanism 34, and is rotated about an axis C at the same speed as the crankshaft 22. The plurality of vanes 12d are disposed within a radially outer portion of the rear covering 12b such that the vanes 12d are arranged successively in a circumferential direction of the rear covering 12b. The turbine impeller 14 is provided with a disc-like hub portion 14a, a cylindrical shaft portion 14b, and a plurality of vanes 14d. The hub portion 14a is splined to an end portion of the input shaft 26 and is held in abutting contact with the front covering 12a through a sliding ring 12e such that the hub portion 14a is rotatable relative to the front covering 12a. The cylindrical shaft portion 14b extends from a radially inner part of the hub portion 14a such that the cylindrical shaft portion 14b is splined to the end portion of the input shaft 26. The vanes 14d are disposed within a radially outer portion of the hub portion 14a such that the vanes 14d are opposed to the vanes 12d and arranged successively in a circumferential direction of the hub portion 14a. The turbine impeller 14 is rotated about the axis C together with the input shaft 26. The stator impeller 20 is provided with a disc portion 20a and a cylindrical portion 20b. The disc portion 20a has vanes 20d formed in its radially outer portion such that the vanes 20d are positioned between the vanes 12d of the pump impeller 12 and the vanes 14d of the turbine impeller 14. The cylindrical portion 20b is formed radially inwardly of the disc portion 20a and incorporates the one-way clutch 18. The stator impeller 20 is supported by a stationary member in the form of a cylindrical stationary shaft 28 fixed to the housing 8, such that the stator impeller 20 is rotatable about the axis C through the one-way clutch 18.

The housing 8 has a partition wall 24a which defines on its opposite sides a space accommodating the transmission 24 and a space accommodating the torque converter 10. The partition wall 24a is provided with a hydraulic pump 30 which has a pump body 30a fixed to the partition wall 24a, a pump covering 30b fixed to the pump body 30a, and an inner ring gear 30c and an outer ring gear 30d which are rotatably accommodated in a space formed between the pump body 30a and the pump covering 30b and which mesh with each other. The inner ring gear 30c is held in engagement with an end portion of a cylindrical shaft 12f extending from a radially inner portion of the rear covering 12b of the pump impeller 12, such that the inner ring gear 30c is not rotatable relative to the cylindrical shaft 12f, so that the hydraulic pump 30 is operated by the engine 21. The above-described hydraulic pump 30, namely, its pump body 30a projects from the partition wall 24a such that the pump body 30a takes the form of a cone pointing toward the torque converter 10, that is, toward the engine 21 or the input side of the torque converter 10.

The radially outer portion of the rear covering 12b constituting an output-side part of the pump covering 12c of the pump impeller 12, that is, a part of the pump covering 12c located on the side of the transmission 24, and the radially outer portion of the front covering 12a constituting an input-side part of the pump covering 12c, that is, a part of the pump covering 12c located on the side of the engine 21, are offset toward the output side, that is, toward the side of the transmission 24, whereby the radially inner portion of the rear covering 12b is concave toward the input side, so as to form a space accommodating the distal end portion of the pump body 30a. Namely, the distal end portion of the pump body 30a overlaps the radially outer portion of the rear covering 12b in the radial direction. This configuration improves an efficiency of space utilization of the torque converter 10, resulting in shortening of the dimension of the torque converter 10 in the direction of the axis C.

Accordingly, the vanes 12d of the pump impeller 12 formed on the inner wall surface of the radially outer portion of the rear covering 12b which is offset toward the transmission 24 are offset toward the output side, so that the vanes 20d of the stator impeller 20 and the vanes 14d of the turbine impeller 14 are similarly offset toward the output side, that is, toward the side of the transmission 24, with a predetermined relative positional relationship with the vanes 12d of the pump impeller 12. In the present embodiment, the stator impeller 20 takes the form of a cone, with the radially outer portion of the disc portion 20a being positioned on the side of the transmission 24 with respect to its cylindrical portion 20b, so that the vanes 20d of the stator impeller 20 are offset toward the output side such that the vanes 20d do not overlap the one-way clutch 18 as seen in the radial direction. Further, the hub portion 14a of the turbine impeller 14 takes the form of a cone, with its radially outer portion overlapping the one-way clutch 18 as seen in the radial direction, so that the vanes 14d of the turbine impeller 14 are offset toward the output side such that the vanes 14d partially overlap and do not partially overlap the one-way clutch 18 as seen in the radial direction.

The lock-up clutch 16 is provided with a disc-like piston 16a and an annular friction member 16b. The piston 16a is slidably fitted at its radially inner portion on an outer circumferential surface of the cylindrical shaft portion 14b extending from the radially inner part of the hub portion 14a of the turbine impeller 14, which hub portion 14a is fitted to the end portion of the input shaft 26 such that the hub portion 14a is not rotatable relative to the input shaft 26. The piston 16a is held in engagement with engaging protrusions 14e protruding from the vanes 14d of the turbine impeller 14, such that the piston 16a is not rotatable relative to the turbine impeller 14. The friction member 16b is fixed to a radially outer portion of the piston 16a, or to a radially outer portion of the front covering 12a opposed to the radially outer portion of the piston 16a, for direct connection of the turbine impeller 14 and the pump impeller 12 to each other with a friction force. As described above, the radially outer portion of the front covering 12a constituting the input-side part of the pump covering 12c, that is, the part of the pump covering 12c located on the side of the engine 21, is offset toward the output side, that is, toward the side of the transmission 24, so that the radially outer portion of the piston 16a is similarly offset toward the output side, that is, toward the side of the transmission 24, so as to prevent an interference of the above-indicated radially outer portion with the front covering 12a and the turbine impeller 14. Thus, the radially outer portions of the piston 16a of the lock-up clutch 16 and the front covering 12a are offset toward the output side, such that the radially outer portion of the piston 16a and the friction member 16b fixed thereto overlap the one-way clutch 18 as seen in the radial direction.

The driving plate 32 fixed to the end of the crankshaft 22 of the engine 21 is provided with a disc-like portion 32a, and a ring gear 32b which is fixed to a radially outer portion of the disc-like portion 32a and which is held in meshing engagement with a pinion of a starter motor not shown. The damper mechanism 34 is disposed between the driving plate 32, and the front covering 12a constituting the front-side part of the pump covering 12c.

The damper mechanism 34 is provided with a disc-like damper hub 38 and a damper housing 42. The damper hub 38 is fixed at its radially inner portion to the front covering 12a, and has a plurality cutouts 38a formed in its radially outer portion at respective positions which are equally spaced apart from each other in the circumferential direction. The cutouts 38a are provided for partially accommodating two kinds of coil springs in the form of large-diameter damper springs 36a and small-diameter damper springs 36b such that the two kinds of coil springs are arranged elongatedly in the circumferential direction of the damper mechanism 34 and such that the corresponding large-diameter and small-diameter damper springs 36a and 36b are concentric with each other. The damper housing 42 is supported rotatably about the axis C, by the front covering 12a via a bearing 40, and is fixed to the disc-like portion 32a of the driving plate 32. The damper housing 42 has a plurality of cylindrical spaces which are formed so as to extend in the circumferential direction, at respective positions which are equally spaced apart from each other in the circumferential direction. Each of the cylindrical spaces partially accommodates the corresponding set of the large-diameter and small-diameter damper springs 36a, 36b, whereby the damper springs 36a, 36b are partially covered by the damper housing 42. The large-diameter and small-diameter damper springs 36a and 36b are compressed according to a difference between rotary phases of the damper hub 38 and the damper housing 42, so as to absorb a variation of the torque transmitted from the engine 21.

As described above, the radially outer portion of the front covering 12a constituting the input-side part of the pump covering 12c of the pump impeller 12, that is, the part of the pump covering 12c located on the side of the engine 21, is offset toward the output side, that is, toward the side of the transmission 24, so that an annular space S is formed on the input side of the radially outer portion of the front covering 12a, that is, on the side of the engine 21, namely, between the radially outer portion of the front covering 12a and the driving plate 32. The above-described damper mechanism 34 is disposed within this space S. The damper mechanism 34 has an axial center position PD which is aligned with a center of the coil of each of the large-diameter and small-diameter damper springs 36a, 36b, in the direction of the axis C. This axially central position PD is offset toward the output side with respect to the end of the input shaft 26 and to the input-side end of the cylindrical shaft portion 14b of the turbine impeller 14, so that the damper mechanism 34 overlaps the end portion of the input shaft 26 and the cylindrical shaft portion 14b (radially inner portion of the turbine impeller 14) as seen in the radial direction. Accordingly, the radially inner portion of the front covering 12a constituting the input-side part of the pump covering 12c is offset toward the input side, that is, on the side of the engine 21, with respect to the radially outer portion, and overlaps a substantially entire portion of the damper mechanism 34 as seen in the radial direction.

As a result, the large-diameter damper springs 36a and the small-diameter damper springs 36b of the damper mechanism 34 can be located at a more radially outer position than in the prior art arrangement, so that each coil of the damper springs 36a, 36b can be given a larger diameter and the damper springs 36a, 36b can be given a larger distance between the axis of each coil and the axis C, whereby the damper mechanism 34 can have a larger angle of torsion corresponding to a certain amount of variation of the input torque, exhibiting a softer damping characteristic and a higher damping performance. Since the damper mechanism 34 exhibits the higher damping performance, the torque variation can be efficiently damped, so that the engine 21 can be operated under a low-speed high-load operating condition that results in a high degree of fuel combustion efficiency. In addition, since the damper mechanism 34 overlaps the input shaft 26, the torque converter 10 is stably supported by the input shaft 26 through the piston 16a and the turbine impeller 14 during running of the vehicle in a locked-state of the lock-up clutch 16, with effective reduction of vibrations caused by external factors. Further, the one-way clutch 18 and the input shaft 26 can be more easily assembled with the torque converter 10, owing to the central position PD of the damper mechanism 34 in the direction of the axis C, which central position PD overlaps the end portion of the input shaft 26 and the cylindrical shaft portion 14b of the turbine impeller 14 as seen in the radial direction. Furthermore, a load acting on the input shaft 26 in the radial direction in the presence of misalignment of the axes of the crankshaft 22 of the engine 21 and the input shaft 26 can be made smaller than in the case where the damper mechanism 34 is spaced from the cylindrical shaft portion 14b of the turbine impeller 14 in the direction of the axis C, whereby the durability of the input shaft 26 can be increased.

Figure 2:
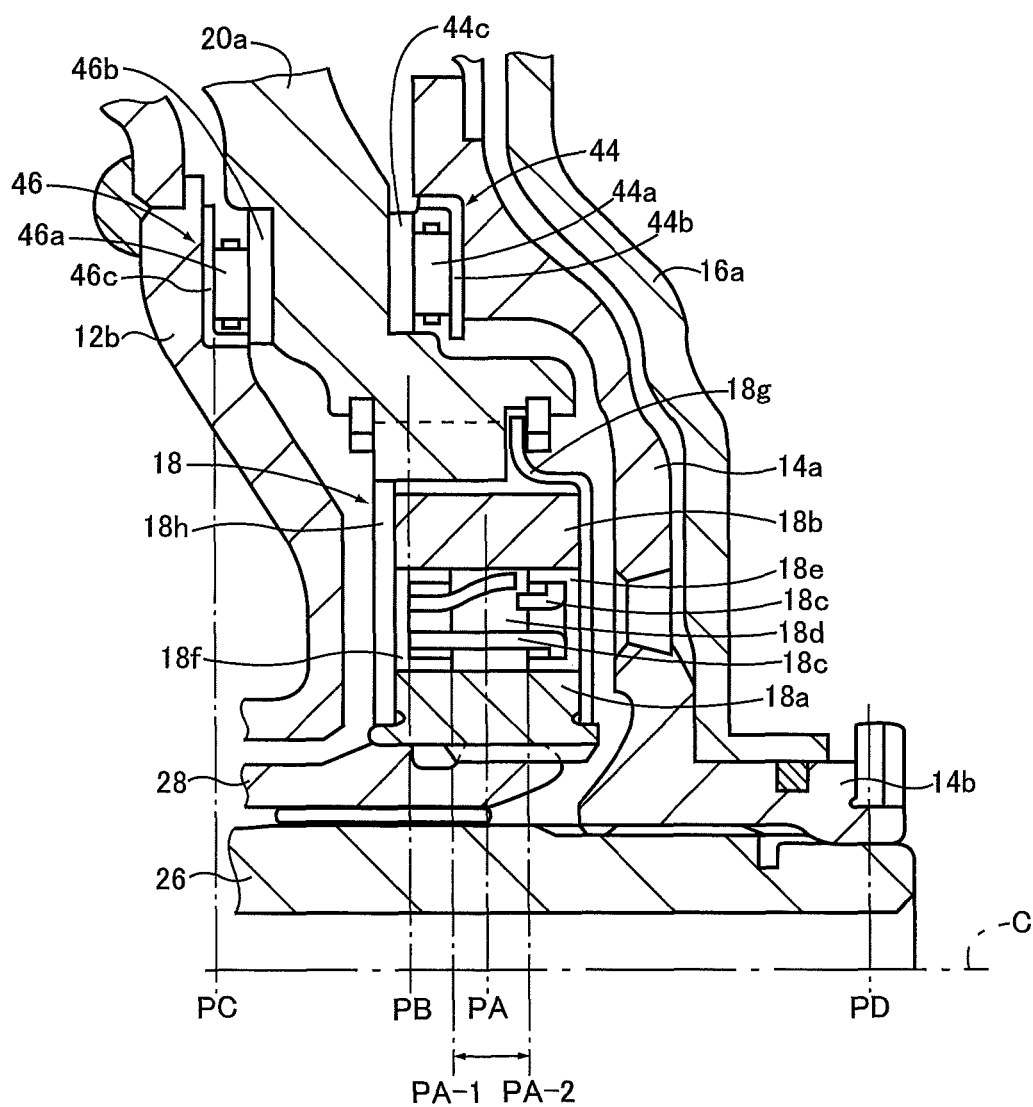
FIG. 2 is a fragmentary cross sectional view for explaining arrangements of a stator impeller of the vehicular torque converter of FIG. 1 and a one-way clutch supporting the stator impeller.

As shown in detail in FIG. 2, the one-way clutch 18 is provided with; an inner race 18a splined to an end portion of the cylindrical stationary shaft 28 such that the inner race 18a is not rotatable relative to the cylindrical stationary shaft 28; an outer race 18b fitted to an inner circumferential surface of the disc portion 20a of the stator impeller 20 such that the outer race 18b is not rotatable relative to the disc portion 20a; a plurality of sprags 18d disposed in an annular space formed between an inner circumferential surface of the outer race 18b and an outer circumferential surface of the inner race 18a and retained by a retainer 18c such that the sprags 18d are spaced apart from each other at a predetermined spacing interval in the circumferential direction of the retainer 18c; a pair of a first side bearing 18e and a second side bearing 18f which are fitted in respective opposite end portions of the above-indicated annular space between the inner circumferential surface of the outer race 18b and the outer circumferential surface of the inner race 18a; and a pair of a first side plate 18g and a second side plate 18h which are held in contact with respective opposite end faces of the above-indicated inner and outer races 18a and 18b and which are retained by respective retainer rings. The pair of side bearings 18e and 18f are annular rings which are formed of an alloy used for sliding parts and which are U-shaped in cross section. The side bearings 18e and 18f function to rotatably support the stator impeller 20 while bearing a load acting on the stator impeller 20, to maintain the annular space between the inner and outer races 18a and 18b, and to center the stator impeller 20 and the outer race 18b about the common axis.

The stator impeller 20 is movable in the direction of the axis C, since the stator impeller 20 is rotatably supported by the cylindrical stationary shaft 28 via the one-way clutch 18 provided with the inner race 18a which is splined to the end portion of the cylindrical stationary shaft 28 such that the inner race 18a is not rotatable relative to the cylindrical stationary shaft 28, as described above. However, a front-side first thrust bearing 44 is interposed between the stator impeller 20 and the hub portion 14a of the turbine impeller 14, while a rear-side second thrust bearing 46 is interposed between the stator impeller 20 and the rear covering 12b, so that the stator impeller 20 is kept at a predetermined axial position.

The front-side first thrust bearing 44 is provided with a plurality of elongate rollers 44a, and a pair of a first thrust front race 44b and a first thrust rear race 44c in the form of annular plate members disposed so as to sandwich the plurality of rollers 44a therebetween. The rollers 44a are spaced apart from each other at a predetermined spacing interval in the circumferential direction of the front-side first thrust bearing 44, and have respective axes parallel to the radial direction of the front-side first thrust bearing 44. The first thrust front race 44b is interposed between the rollers 44a and the hub portion 14a of the turbine impeller 14, while the first thrust rear race 44c is interposed between the rollers 44a and the disc portion 20a of the stator impeller 20. The first thrust bearing 44 interposed between the stator impeller 20 and the turbine impeller 14 to bear thrust loads has a friction surface with respect to the stator impeller 20, which friction surface positioned radially outwardly of the one-way clutch 18 and has a position PB in the direction of the axis C that is offset from an output-side end face PA-1 of each sprag 18d toward the output side, that is, toward the side of the transmission 24. In FIG. 2, "PA" represents a center position of each sprag 18d in the direction of the axis C, while "PA-2" represents an axial position of an input-side end face (on the side of the engine 21) of each sprag 18d.

The rear-side second thrust bearing 46 is provided with a plurality of elongate rollers 46a, and a pair of a second thrust front race 46b and a second thrust rear race 46c in the form of annular plate members disposed so as to sandwich the plurality of rollers 46a therebetween. The rollers 46a are spaced apart from each other at a predetermined spacing interval in the circumferential direction of the rear-side second thrust bearing 46, and have respective axes parallel to the radial direction of the rear-side second thrust bearing 46. The second thrust front race 46b is interposed between the rollers 46a and the disc portion 20a of the stator impeller 20, while the second thrust rear race 46c is interposed between the rollers 46a and the rear covering 12b. The second thrust bearing 46 interposed between the stator impeller 20 and the rear covering 12b of the pump impeller 12 to bear thrust loads has a friction surface with respect to the rear covering 12b, which friction surface positioned radially outwardly of the one-way clutch 18 and has a position PR in the direction of the axis C that is offset from the output-side end face PA-1 of each sprag 18d in the axial direction of the axis C of the one-way clutch 18 toward the output side, that is, toward the side of the transmission 24.

Figure 3:
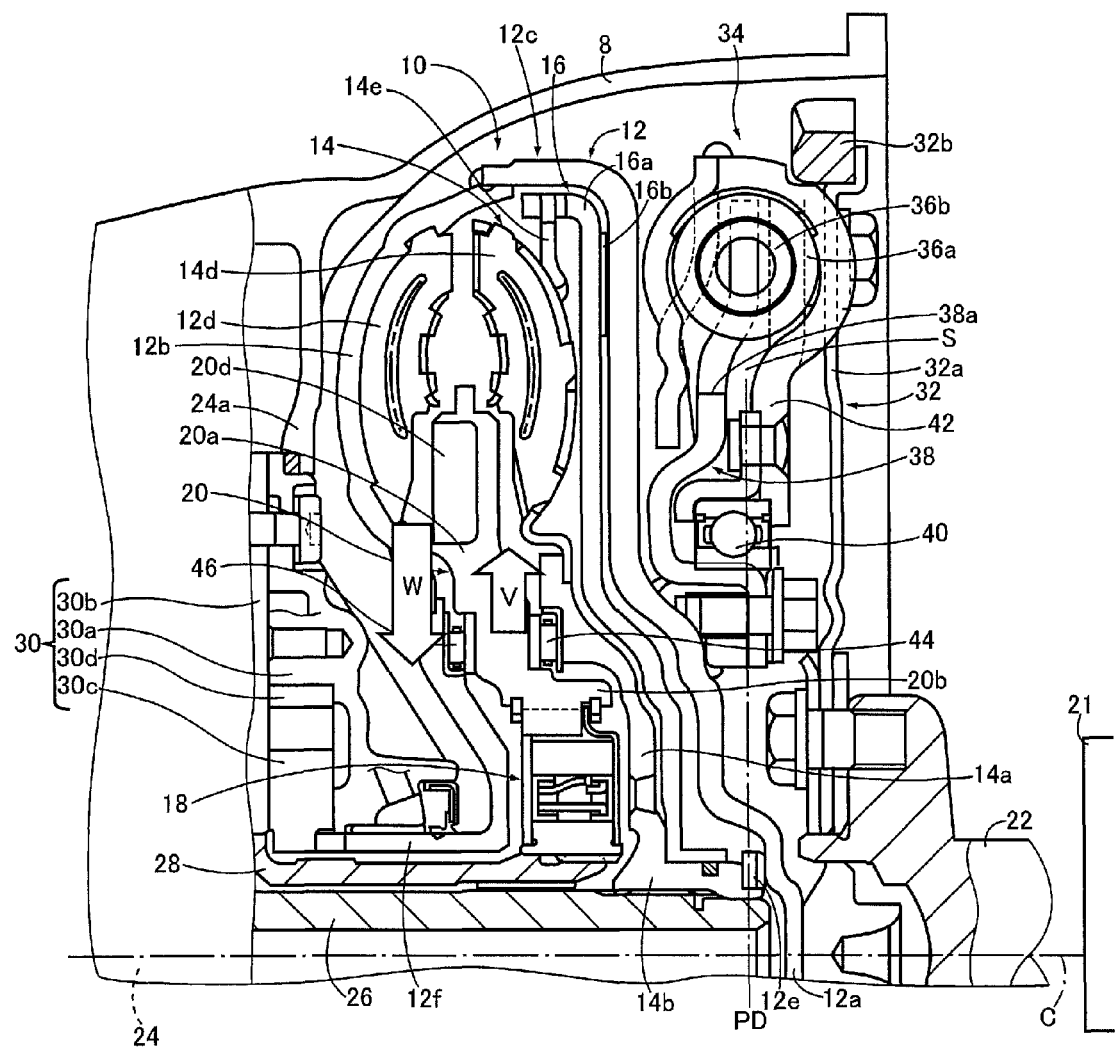
FIG. 3 is a view for explaining reduction of a compression load acting on a side bearing on the side of a pump impeller in the vehicular torque converter of FIG. 1.

By the way, a load on the second side bearing 18f located on the rear side (on the side of the vanes of the pump impeller) during rotation of the stator impeller 20 tends to increase with an increase of variation of its shape and gravity center, due to the offsetting of the disc portion 20a toward the output side. To prevent deformation of the second side bearing 18f, it is necessary to re-design the shape or structure of the second side bearing 18f so as to have a sufficient mechanical strength. However, this re-designing is comparatively difficult, and causes a problem of an increase of a cost of manufacture of the torque converter 10, since the second side bearing 18f is disposed in a narrow annular space between the inner and outer circumferential surfaces of the respective outer and inner races 18b, 18a of the one-way clutch 18. In view of this problem, the present embodiment is configured such that the second thrust bearing 46 interposed between the stator impeller 20 and the rear covering 12b of the pump impeller 12 to bear the thrust load generated due to the above-indicated load on the second side bearing 18f is positioned radially outwardly of the one-way clutch 18 and offset in the direction of the axis C of the one-way clutch 18 from the sprag end face PA-1 toward the output side, that is, toward the side of the transmission 24, in order to reduce the load on the second side bearing 18f. Where the vanes 20d of the stator impeller 20 are offset toward the output side, that is, toward the side of the vanes of the pump impeller, so that the vanes 20d do not overlap the one-way clutch 18 as seen in the radial direction, as shown in FIG. 3, an imbalance of the gravity center of the stator impeller 20 during its rotation causes generation of a moment that causes a load to act on the second side bearing 18f in a direction W. However, the present embodiment is configured such that not only the second thrust bearing 46, but also the first thrust bearing 44 is positioned radially outwardly of the one-way clutch 18 and offset in the direction of the axis C of the one-way clutch 18 from the sprag end face PA-1 toward the output side, so that a reaction force in a direction V that reduces the load on the second side bearing 18f is generated to reduce the load on the second side bearing 18f.

In the vehicular torque converter 10 according to the present embodiment wherein the first thrust bearing 44 is interposed between the stator impeller 20 and the turbine impeller 14 to bear the thrust loads, a sliding surface of the first thrust bearing 44 with respect to the stator impeller 20, as well as a sliding surface of the second thrust bearing 46 with respect to the rear covering 12b, is radially outward of the one-way clutch 18 and offset in the direction of the axis C of the one-way clutch 18 from the sprag end face PA-1 toward the output side. In this respect, it is noted that a radial load acting on the stator impeller 20 during its rotation due to an imbalance of its offset portion generates a moment in the offsetting direction about the output-side end face PA-1 of each sprag 18d of the one-way clutch 18. However, this moment is received by the sliding surfaces of the first thrust bearing 44 and the second thrust bearing 46 with respect to the stator impeller 20, which sliding surfaces are positioned radially outwardly of the one-way clutch 18 and offset in the direction of the axis C of the one-way clutch 18 from the sprag end face PA-1 toward the side of the pump, so that a compression load acting on one of the pair of side bearings 18e and 18f located on the offsetting side, that is, on the side bearing 18f, is reduced, whereby it is not necessary to re-design the shape or structure of the second side bearing 18f so as to have a mechanical strength sufficient to prevent its deformation.

The vehicular torque converter 10 according to the present embodiment is further configured such that the radially outer portion of the front covering 12a constituting a part of the pump covering 12c, which part is located on the side of the drive power source, is offset toward the output side such that the lock-up clutch 16 overlaps the one-way clutch 18 as seen in the radial direction, whereby the annular space S is formed on the drive-power-source side of the radially outer portion of the drive-power-source-side part of the pump covering 12c, so that the damper mechanism 34 for reducing the variation of the input torque can be accommodated within this annular space S formed adjacent to the drive power source. Accordingly, the overall axial dimension of the torque converter 10 can be reduced.

The vehicular torque converter 10 according to the present embodiment is also configured such that the stator impeller 20 is offset toward the output side, that is, toward the vanes of the pump impeller, such that the stator impeller 20 does not overlap the one-way clutch 18 as seen in the radial direction, whereby the large annular space S is formed on the drive-power-source side of the radially outer portion of the front covering 12a constituting the drive-power-source-side part of the pump covering 12c, while the radially outer portion of the rear covering 12b constituting the output-side part of the pump covering 12c projects by a large amount toward the output side, so as to overlap the hydraulic pump 30 in the radial direction by a large amount, so that the overall axial dimension of the torque converter 10 can be further reduced.

While the embodiment of the present invention has been described in detail by reference to the drawings, it is to be understood that the invention may be otherwise embodied.

In the illustrated embodiment, the one-way clutch 18 has the sprags 18d which are rotatable in one of the opposite directions but are not rotatable in the other direction. However, the sprags 18d may be replaced by balls.

In the illustrated embodiment, the vanes 12d of the pump impeller 12, the vanes 14d of the turbine impeller 14, and the vanes 20d of the stator impeller 20 are offset toward the output side. The amount of offset of the vanes 20d of the stator impeller 20 need not be large enough to prevent overlapping of the vanes 20d with respect to the one-way clutch 18.

Further, the illustrated embodiment may be modified such that the side bearings 18e and 18f are constituted by portions of the stator impeller 20, as long as the basic structure of the side bearings 18e and 18f is unchanged with respect to that in the illustrated embodiment.

It is to be understood that the foregoing embodiment and modifications have described for illustrative purpose only, and that the present invention may be embodied with various other changes and improvements which may occur to those skilled in the art.

NOMENCLATURE OF REFERENCE SIGNS

10: Vehicular torque converter
12: Pump impeller
12c: Pump covering
12d: Vanes of pump impeller
14: Turbine impeller
14d: Vanes of turbine impeller
16: Lock-up clutch
18: One-way clutch
18a: Inner race
18b: Outer race
20: Stator impeller
28: Cylindrical stationary shaft (Stationary member)
44: First thrust bearing (Thrust bearing)
46: Second thrust bearing

The invention claimed is:
1. A vehicular torque converter comprising: a pump impeller having a pump covering configured to receive a torque from a drive power source and a plurality of vanes disposed within an output-side portion of said pump covering such that the vanes are arranged successively in a circumferential direction of the pump covering; a turbine impeller having a plurality of vanes opposed to the vanes of said pump impeller and rotated with a working fluid fed from the vanes of said pump impeller; a stator impeller rotatably interposed between said pump impeller and said turbine impeller; a one-way clutch interposed between said stator impeller and a stationary member and supporting said stator impeller such that the stator impeller is rotatable in one direction; and a lock-up clutch configured to connect said turbine impeller to an inner surface of a wall of said pump covering, which wall is located on the side of said drive power source, and wherein the vanes of said stator impeller are offset with respect to said one-way clutch toward the output side, the vehicular torque converter further comprising:

a thrust bearing interposed between said stator impeller and said turbine impeller, to bear thrust loads, said thrust bearing having a sliding surface with respect to said stator impeller, said sliding surface being positioned radially outwardly of said one-way clutch and offset from an end face of each of sprags of the one-way clutch toward the output side.

2. The vehicular torque converter according to claim 1, wherein a part of said pump covering, which part is located on the side of the drive power source, has a radially outer potion which is offset toward the output side such that a radially outer portion of said lock-up clutch overlaps said one-way clutch as seen in a radial direction of the lock-up clutch.

3. The vehicular torque converter according to claim 1, wherein the vanes of said stator impeller are offset toward the output side, such that the vanes of the stator impeller do not overlap said one-way clutch as seen in a radial direction of the stator impeller.

* * * * *